(12) United States Patent
Ellis

(10) Patent No.: US 10,334,922 B2
(45) Date of Patent: Jul. 2, 2019

(54) POCKETED ARTICLE AND METHOD OF MAKING THE SAME

(71) Applicant: Amer Sports Canada Inc., North Vancouver (CA)

(72) Inventor: Shane Ellis, Bellevue, WA (US)

(73) Assignee: Amer Sports Canada Inc., North Vancouver, B.C. (CA)

( * ) Notice: Subject to any disclaimer, the term of this patent is extended or adjusted under 35 U.S.C. 154(b) by 117 days.

(21) Appl. No.: 15/333,644

(22) Filed: Oct. 25, 2016

(65) Prior Publication Data

US 2018/0111328 A1   Apr. 26, 2018

(51) Int. Cl.
| | |
|---|---|
| A45C 1/00 | (2006.01) |
| B32B 1/02 | (2006.01) |
| A45C 1/02 | (2006.01) |
| A45C 1/06 | (2006.01) |
| A45C 1/08 | (2006.01) |
| A45C 1/10 | (2006.01) |
| B32B 5/02 | (2006.01) |
| B31B 70/00 | (2017.01) |
| A45C 3/00 | (2006.01) |

(52) U.S. Cl.
CPC ............. *A45C 1/00* (2013.01); *A45C 1/02* (2013.01); *A45C 1/06* (2013.01); *A45C 1/08* (2013.01); *A45C 1/10* (2013.01); *A45C 3/001* (2013.01); *B31B 70/00* (2017.08); *B32B 1/02* (2013.01); *B32B 5/02* (2013.01)

(58) Field of Classification Search
CPC .... B32B 1/02; B32B 5/02; A45C 1/00; A45C 1/02; A45C 1/06; A45C 1/08; A45C 1/10
See application file for complete search history.

(56) References Cited

U.S. PATENT DOCUMENTS

| | | | |
|---|---|---|---|
| 4,467,551 A * | 8/1984 | Pulver | A01K 97/06 206/315.1 |
| 8,418,267 B2 | 4/2013 | Shaw et al. | |
| 8,765,257 B2 | 7/2014 | Weedlun | |
| 2002/0162865 A1 | 11/2002 | Beletsky et al. | |
| 2002/0164913 A1 | 11/2002 | Pieters | |
| 2008/0066410 A1 | 3/2008 | Dalle Mese et al. | |
| 2012/0301711 A1 | 11/2012 | Tovar | |
| 2014/0250564 A1 | 9/2014 | Ramos | |

* cited by examiner

*Primary Examiner* — Walter Aughenbaugh
(74) *Attorney, Agent, or Firm* — Terence P. O'Brien; Todd A. Rathe

(57) ABSTRACT

A pocketed article includes a first primary panel, a liner panel having a first face bonded to the primary panel and a second face opposite the first face of the liner panel and a secondary panel having a first face facing the second face of the liner panel and a second face opposite the first face of the secondary panel. Outer portions of the liner panel are folded about edges of the secondary panel. The outer portions are bonded to the second face of the secondary panel. A second primary panel is joined to the first primary panel.

20 Claims, 17 Drawing Sheets

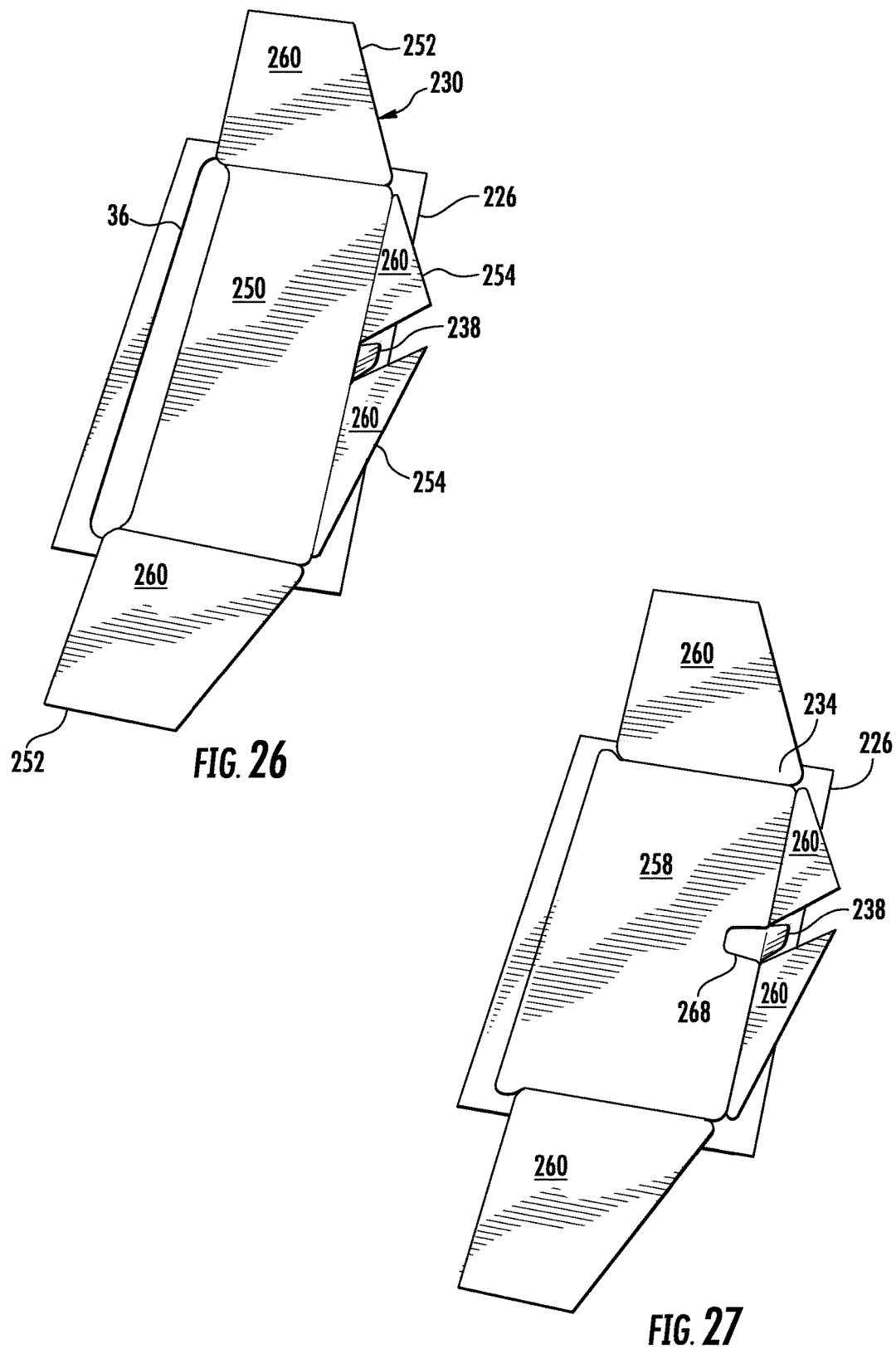

POCKETED ARTICLE AND METHOD OF MAKING THE SAME

BACKGROUND

Various articles include pockets to contain smaller objects. Examples of such articles, amongst others, include wallets, purses and clothing apparel.

BRIEF DESCRIPTION OF THE DRAWINGS

FIG. 26 is a top perspective view illustrating securement of a second liner panel on the folded flaps of the first liner panel and the second liner panel.

FIG. 27 is a top perspective view illustrating securement of a second secondary panel on the second liner panel.

DETAILED DESCRIPTION OF EXAMPLES

The pocket or pockets of pocketed articles typically have interiors defined by two opposing panels directly joined to one another along the perimeter of the pocket. In pocketed articles that are made from leather, the two panels are typically joined together along the perimeter of the pocket with stitching. The junction of the two panels along the perimeter of the pocket undergoes relatively high stress and wear over time as the pocket is sometimes over filled with objects and is repeatedly widened and narrowed or stretched. Such high stress may lead to damage or failure of the pocket, such as stretching or breaking of the stitches. Further, the stitching of panels necessarily creates small holes in the panels that can contribute to premature failure of the pocketed article at a stitched location. Additionally, stitching can sometimes provide an undesirable aesthetic appearance to a pocketed article. Stitching also results in the thread being raised above the surface of the material so it is susceptible to abrasion.

The present disclosure describes a pocketed article having at least one pocket formed by a combination of four panels: a first primary panel, a second primary panel, a liner panel, and a secondary panel. The first primary panel supports and is bonded to the liner panel. The second primary panel is bonded to the first primary panel. The liner panel underlies the secondary panel and has outer portions that are folded about edges of the secondary panel and bonded to a first face of the secondary panel, wherein a pocket is formed between a central portion of the liner panel and a second face of the secondary panel. The perimeter of the pocket has a joint provided by a fold line between the central portion and the outer portions of the liner panel. This fold line provides a joint about which the pocket opens and closes, and provides the pocket of the pocketed article with greater durability and reliability as compared to a pocket formed by two panels directly joined to one another with stitching or other means. The constructions disclosed in the present disclosure also provide a smooth clean aesthetically pleasing appearance that is desirable in many applications and preferred over stitched articles.

Figure 1:
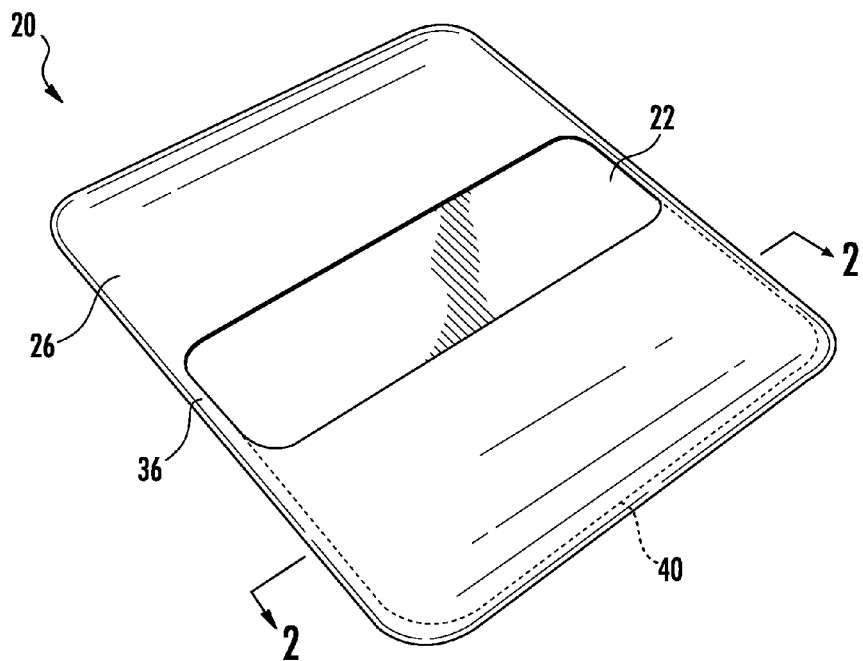
FIG. 1 is a top perspective view of an example pocketed article.
Figure 2:
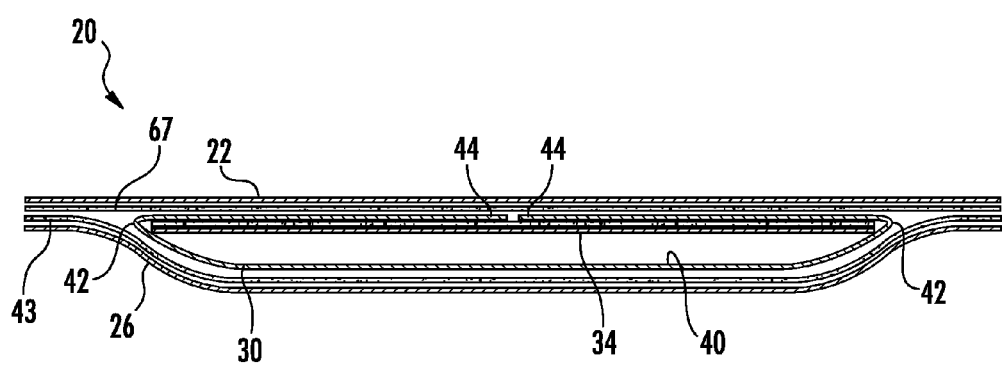
FIG. 2 is a sectional view of the pocketed article of FIG. 1.

FIGS. 1 and 2 illustrate an example pocketed article 20, shown as a wallet. Pocketed article 20 comprises an outer primary panel 22, an inner primary panel 26, a liner panel 30 and a secondary panel 34. Outer primary panel 22 comprises a substantially imperforate or solid panel that forms the exterior of article 20 when article 20 is folded. Inner primary panel 26 forms an interior of the folded article 20. As shown by FIG. 1, inner primary panel 26 has a window or opening 36 which provides access to a pocket 40 of article 20. Although illustrated as being substantially rectangular and as extending along substantially the entire width of article 20, in other implementations, opening 36 may have other sizes or shapes.

As shown by FIG. 2, the inner primary panel 26 is joined to outer primary panel 22 along a perimeter of the pocketed article 20. Such joining may be achieved by adhesives or welds. In some implementations, the inner primary panel 26 may be joined to the outer primary panel 22 along a perimeter of the pocketed article 20 by stitching, wherein such stitching undergoes less stress due to the described construction of the pocket of article 20.

Liner panel 30 comprises a panel of material folded between or within panels 22 and 26 about a formed pocket 40. In one implementation, liner panel 30 is formed from a material to facilitate folding or bending of panel 30 about pocket 40. In one implementation, liner panel 30 is formed from a material having a rigidity or bendability less than that of the material or materials forming panels 22 and 26. In yet another implementation, liner panel 30 is specifically configured with enhanced bending along a perimeter of pocket 40. For example, in one implementation, liner panel 30 may include portions along the perimeter of pocket 40 that are weakened, such as through scoring, perforations, or other forms of material removal. In one implementation, liner panel 30 comprises a panel of a textile or fabric. In other implementations, liner panel 30 may comprise other materials.

Secondary panel 34 comprises a panel of material secured over liner panel 30 within pocket 40 to form an interior face of pocket 40. Secondary panel 34 is secured to liner panel 30 so as to conceal the liner panel 30 and create the pocket, wherein the edges of secondary panel 34 extend adjacent to such folds 42. The edges of secondary panel 34 assist in defining where such folds 42 lie and assist in defining or maintaining the shape of pocket 40. In the example illustrated, secondary panel 34 bridges or spans the end portions 44 of liner panel 30 so as to retain the end portions 44 of liner panel 30 in place despite such end portions being pulled in directions apart from one another when pocket 40 is being opened.

In one implementation, secondary panel 34 has an overall stiffness greater than that of liner panel 30. In one implementation, secondary panel 34 is formed from the same material as that of primary panels 22 and 26. In one implementation, secondary panel 34, like panels 22 and 26, is formed from a leather or synthetic leather. In yet other implementations, secondary panel 34 may be formed from a textile, such as a woven textile, a stiffening cardboard or paper board material, a plastic, a polymer panel or other materials.

Overall, primary panels 22 and 26 form the exterior of the pocketed article 20. Liner panel 30 forms the bendable hinges or folds of pocket 40. Secondary panel 34 assists in maintaining portions of liner panel 30 in place, defining and maintaining the position of the folds of liner panel 30 and defining and maintaining the size and shape pocket 40. These simple panels provide a pocket for article 20 that is durable, reliable and easy to assemble.

Figure 3:
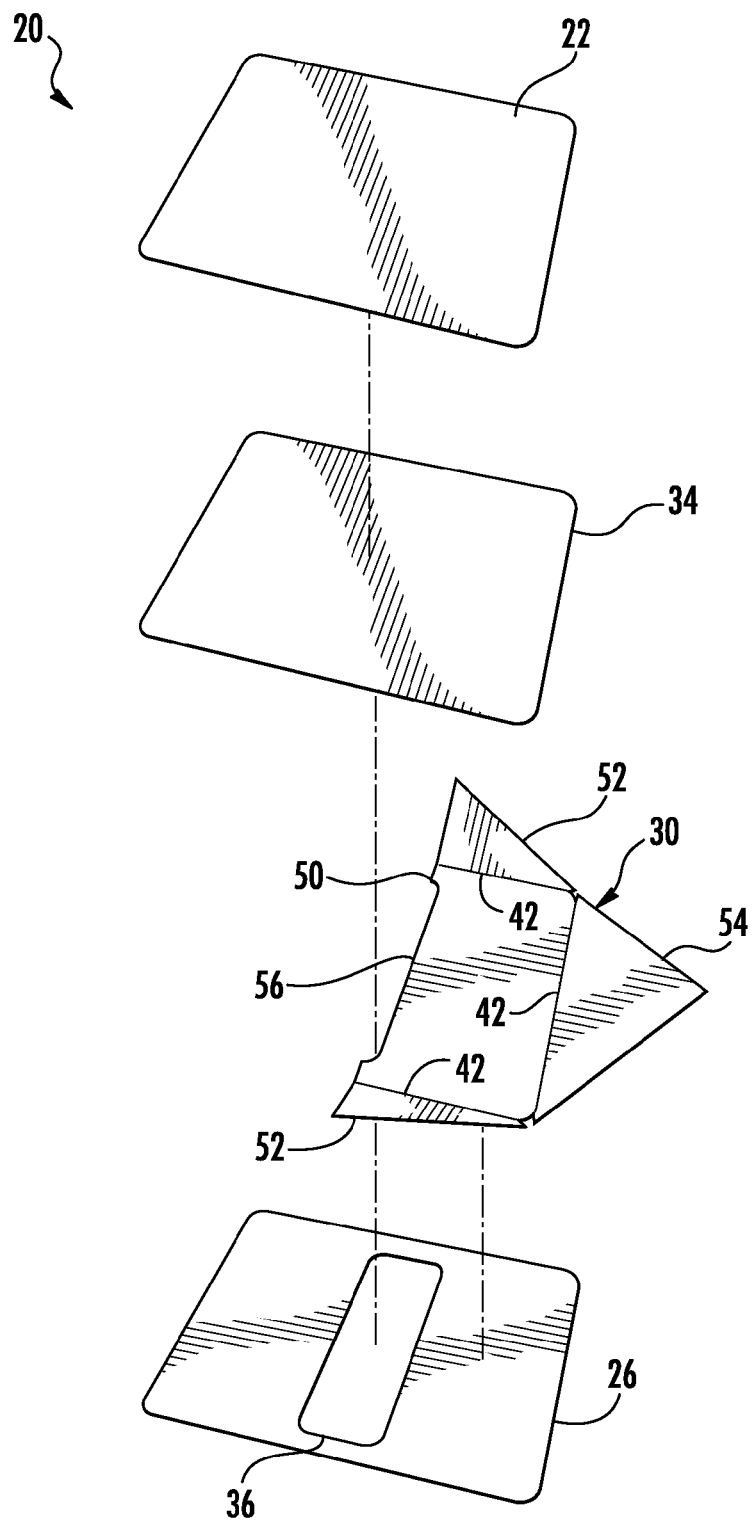
FIG. 3 is an exploded perspective view of the pocketed article of FIG. 1.

FIG. 3 is an exploded perspective view of an example components or panels that may be utilized to form pocketed article 20. As described above and illustrated in FIG. 3, pocketed article 20 comprises primary panel 22, primary panel 26, liner panel 30 and secondary panel 34. In the example shown in FIG. 3, liner panel 30 is illustrated as being generally triangular in shape, comprising a generally rectangular central portion 50 and three triangular flaps, side flaps 52 and end flap 54. In the example illustrated, central portion 50 has an edge cut out 56, allowing a portion 56 to extend around the two corners of opening 36 of primary panel 26 when assembled against primary panel 26. Central portion 50 is joined to flap 52, 54 along the folds 42 (described above) which form the joints or hinges about the edges of the formed pocket 40.

As will be shown hereafter, the three triangular flaps, when fully folded into a flat state opposite central portion 56, substantially abut one another edge-to-edge such that the flaps do not overlap one another to create an uneven bulge over pocket 40 and such that the flaps are not substantially spaced from one another along their edges so as to form a discernible recess or depression in the plane formed by the three folded triangular flaps 52, 54 over pocket 40. In other implementations, liner panel 30 may comprise a greater or fewer of such flaps and may comprise flaps that overlap one another. For example, in one implementation, two or more of flaps 52, 54 may completely overlap one another, avoiding any discernible bulge or depression. In such implementations, because the two or more flaps completely overlap one another, the multiple panels formed by such flaps may increase the overall thickness of pocketed article 20.

Figure 4:
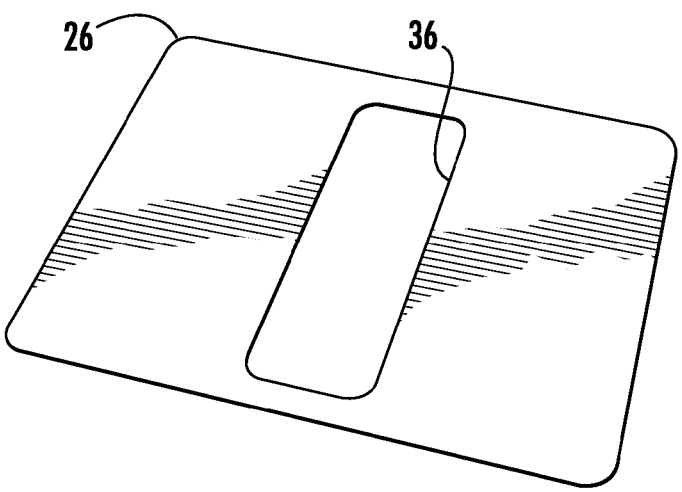
FIG. 4 is a top perspective view of a first example primary panel of the pocketed article of FIG. 1.
Figure 5:
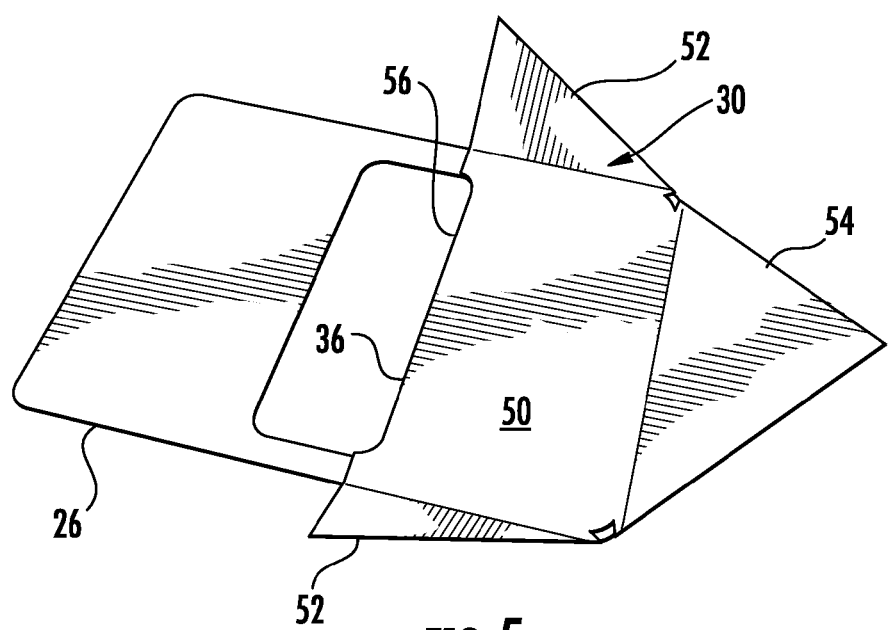
FIG. 5 is a top perspective view of an example liner panel secured on the first example primary panel of FIG. 4.

FIGS. 4-8 illustrate one example method for forming pocketed article 20 from the components shown in FIG. 3. As shown in FIG. 4, primary panel 26 is placed upon a flat surface. As shown by FIG. 5, liner panel 30 is placed on top of primary panel 26 with edge cut out 56 aligned with one edge of window 36 of primary panel 26. In one implementation, the bottom or backside of liner panel 30 has an adhesive layer which adheres liner panel 30 to primary panel 26 in the position illustrated. In one implementation, the adhesive layer is covered by peel away film, wherein the peel away film is removed when liner panel 30 is to be assembled to liner panel 26. In other implementations, such an adhesive layer or film may be omitted.

In other implementations, portions of primary panel 26 may include an adhesive (such as the example adhesive layer 43 shown in FIG. 2) for adhering liner panel 30 to portions of primary panel 26 as illustrated in FIG. 5. In yet other implementations, liner panel 30 may be joined to primary panel 26 in the position shown in other fashions. For example, in other implementations, liner panel 30 may be fused or welded to primary panel 26. In still other implementations, liner panel 30 may be joined to primary panel 26 by stitching.

Figure 6:
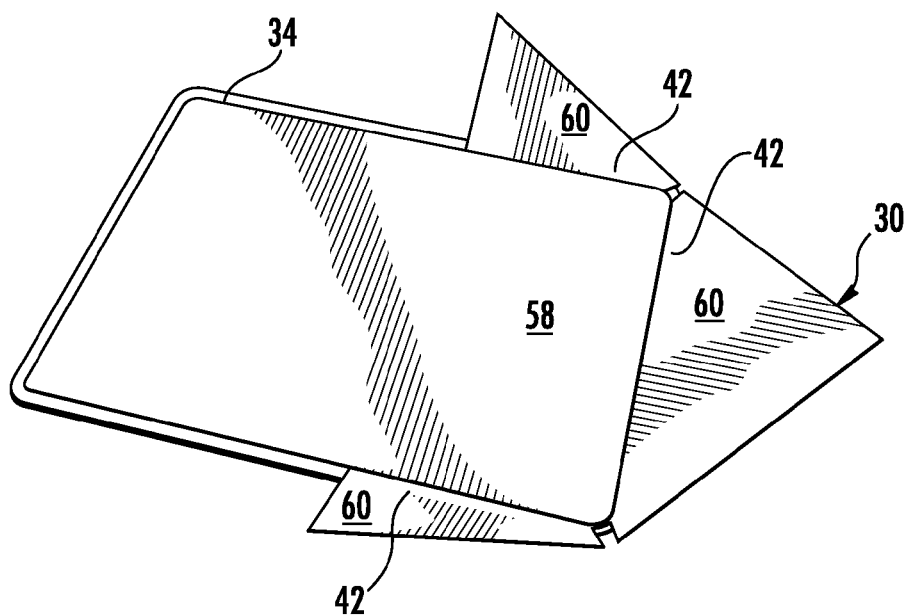
FIG. 6 is a top perspective view of a secondary panel being secured on top of the example liner panel of FIG. 5.
Figure 7:
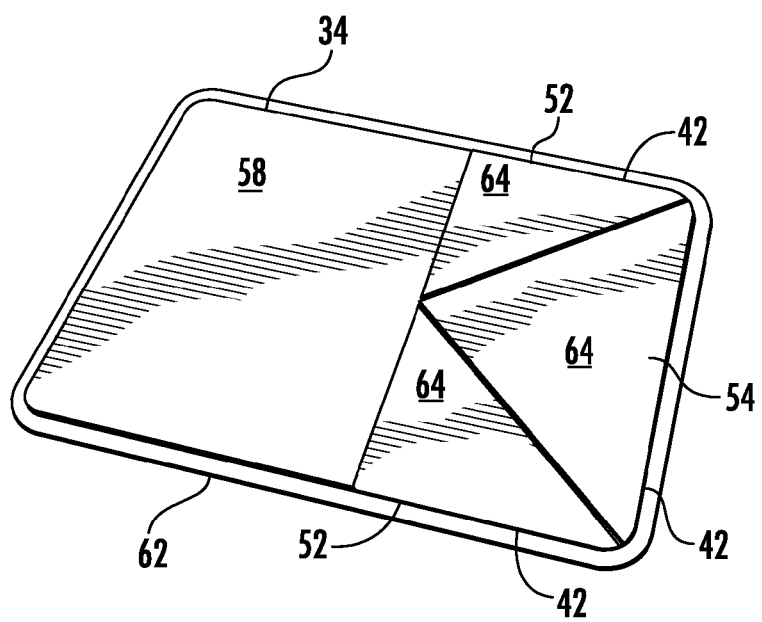
FIG. 7 is a top perspective view illustrating folding of flaps of the liner panel about edges of the secondary panel of FIG. 6.

As illustrated by FIG. 6, secondary panel 34 is placed on top of central portion 50 and on top of those uncovered portions of primary panel 26, including window 36. As shown by FIG. 7, flaps 52 and 54 are folded about folds 42 so as to extend over and opposite to secondary panel 34. As further shown by FIG. 7, flaps 52 and 54 effectively mate with one another in an edge-to-edge abutting fashion so as to not overlap one another and so as to not form any discernible valleys or recesses therebetween.

Once in the folded state shown in FIG. 7, flaps 52 and 54 are secured in place to face 58 of secondary panel 34. In one implementation, face 58 of secondary panel 34 includes an adhesive layer that adhesively bonds and retains flaps 52 and 54 in place against face 58 of secondary panel 34. In another implementation, faces 60 of flaps 52 and 54 have an adhesive layer that adhesively bonds and retains flaps 52 and 54 in place against face 58 of secondary panel 34. In such implementations, the adhesive layers may be temporarily covered by a peel away film that may be peeled away when such adhesive layers are to be exposed and used. In another implementation, the adhesive layers may be non-sticky or non-adhesive until activated, such as being activated through the application of heat. In such implementations, once flaps 52 and 54 have been folded, heat may be applied to activate the adhesive to effectuate the adhesive bond.

Once liner panel 30 has been folded to the state shown in FIG. 7, pocket 40 is formed. Pocket 40 extends between portions of central portion 50 of liner panel 30 and portions of the lower face 62 of secondary panel 34 that face and extend directly opposite to central portion 50. Folds 42 form the perimeter edges of the formed pocket 40.

Figure 8:
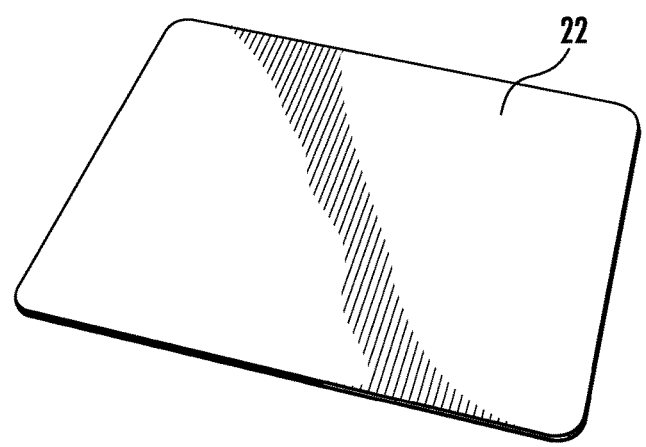
FIG. 8 is a top perspective view illustrating securing of a second example primary panel over the folded flaps of the liner panel.

As shown by FIG. 8, the pocketed article 20 is completed by securing primary panel 22 on top of flap 52 and 54 and on top of the uncovered portions of face 58 of secondary panel 34 shown in FIG. 7. In one implementation, the lower face of primary panel 22 includes an adhesive layer 67 (shown in FIG. 2) for securing primary panel 22 across and to each of flaps 52, 54 and uncovered portions of face 58 of secondary panel 34. In other implementations, the uncovered portions of face 58 of secondary panel 34 and surfaces 64 of flaps 52 and 54 may include an adhesive layer adhesively bonding with primary panel 22. As discussed above, the adhesive layer may be covered with a peel away film when the adhesive layer is to be used or may be selectively activatable to an adhesive state.

In yet other implementations, primary panel 26 may project beyond perimeter portions of secondary panel 34 and liner layer 30, wherein primary panel 22 may be secured to primary panel 26, with or without being additionally secured to secondary panel 34 and/or liner panel 30. In one implementation, primary panel 22 is adhesively bonded to those portions of primary panel 26 projecting beyond secondary panel 34 and liner panel 30. In yet other implementations, primary panel 22 is welded or stitched to those portions of primary panel 26 projecting beyond secondary panel 34 and liner panel 30. Because the hinges of pocket 40 about which pocket 40 expands and contracts are not formed by such adhesive and/or other stitching, but are formed by the folds 42 of liner panel 30, the formed pocket 40 is more durable.

Figure 9:
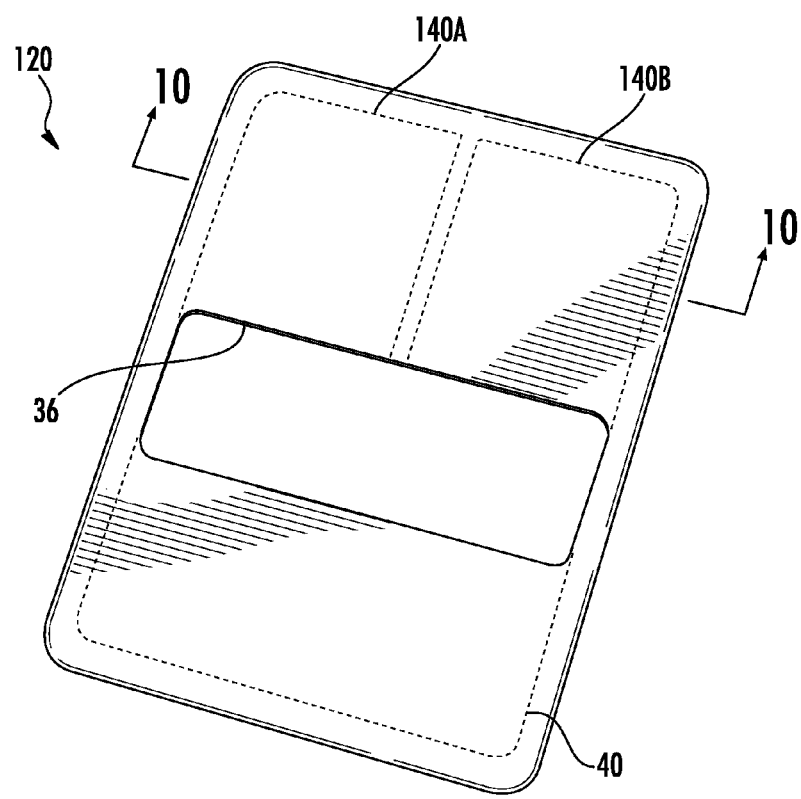
FIG. 9 is a top perspective view of another example pocketed article.
Figure 10:
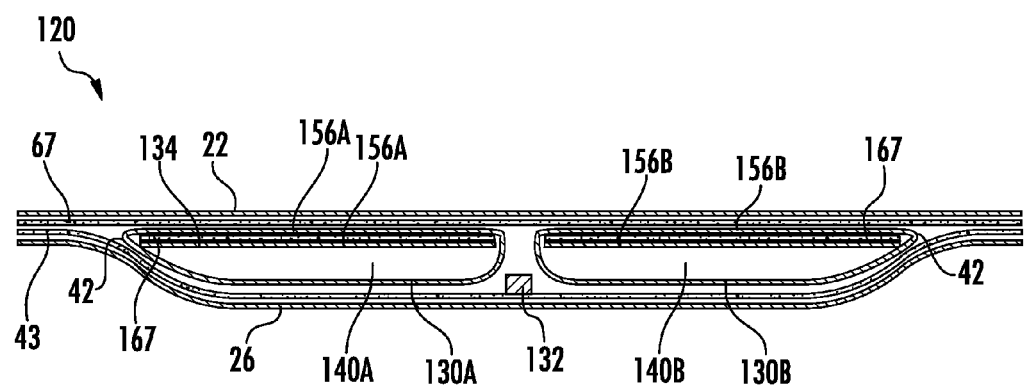
FIG. 10 is a sectional view of the pocketed article of FIG. 9 taken along line 10-10.

FIGS. 9 and 10 illustrate an example pocketed article 120. As shown by FIG. 9, pocketed article 120 is similar to pocketed article 20 except that pocketed article 120 comprises additional pockets 140A, 140B (collectively referred to as pockets 140) on the opposite side of the window 36 as pocket 40. As shown by FIG. 10, each of pockets 140 has a construction similar to that of pocket 40. Each of pockets 140 has a liner panel that underlies the secondary panel and has outer portions that are folded about edges of the secondary panel and bonded to a first face of the secondary panel, wherein an individual pocket 140A, 140B is formed between a liner panel and a second face of the secondary panel. The perimeter of the pocket has a joint provided by fold lines of the liner panel. These fold lines, providing a joint about which the individual pocket 140A, 140B opens and closes, provide the individual pocket 140A, 140B of the pocketed article 120 with greater durability and reliability as compared to a pocket formed by two panels directly joined to one another with stitching or other means.

Figure 11:
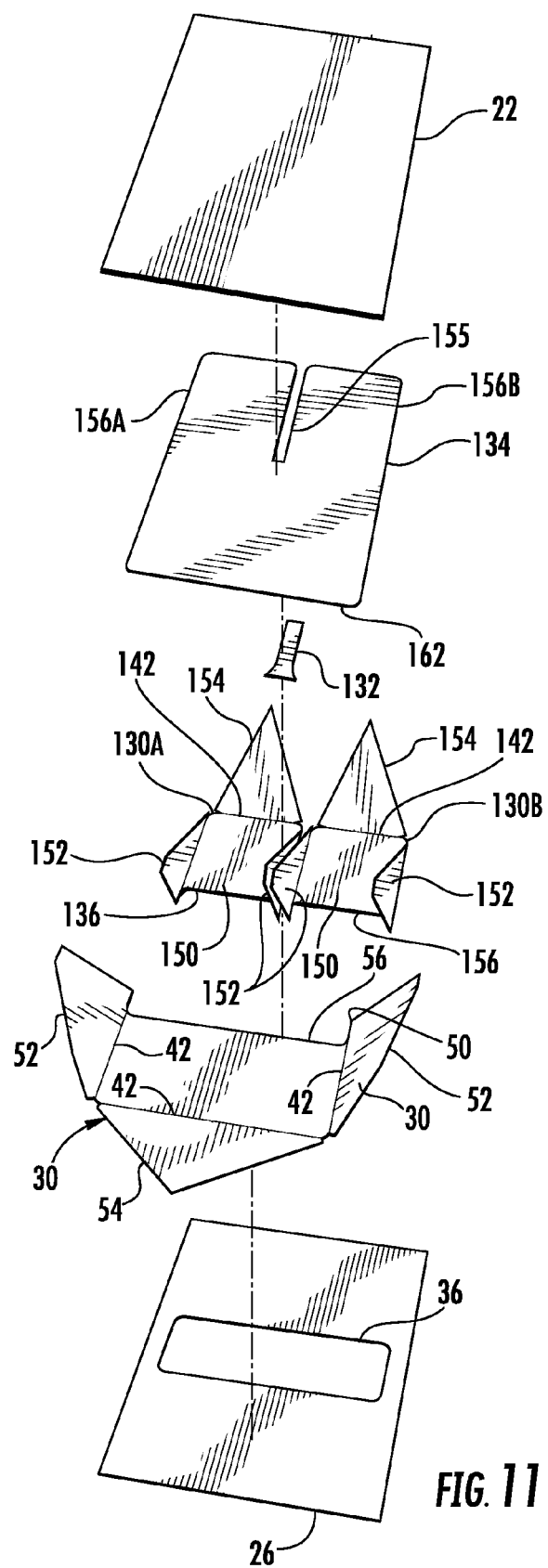
FIG. 11 is an exploded perspective view of the pocketed article of FIG. 9.
Figure 12:
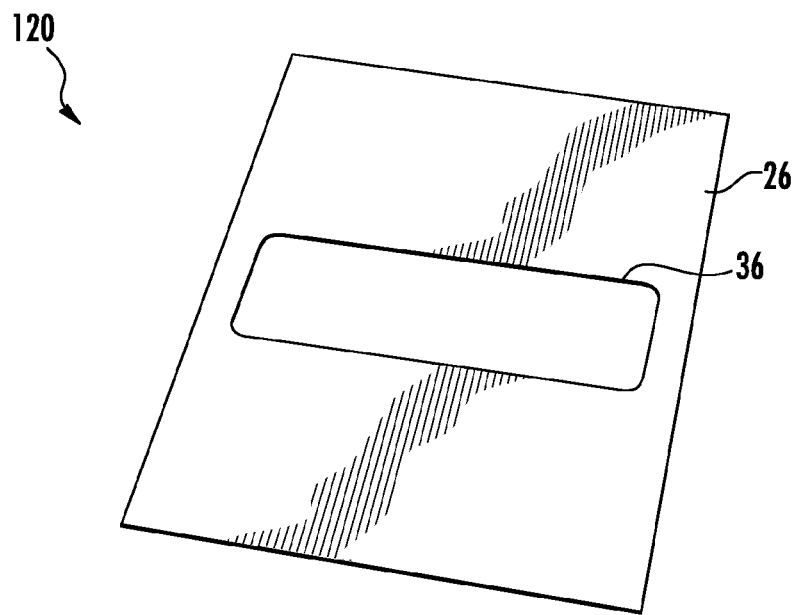
FIG. 12 is a top perspective view of an example first primary panel of the pocketed article of FIG. 9.

FIG. 11 is an exploded perspective view of example components or panels that may be utilized to form pocketed article 120. As described above and illustrated in FIG. 11, pocketed article 120 comprises outer primary panel 22, inner primary panel 26, liner panel 30, liner panels 130A, 130B, spacer 132 and secondary panel 134. In the example shown in FIG. 11, liner panels 130 each have a generally triangular shape, comprising a generally rectangular central portion 150 and three triangular flaps, side flaps 152 and end flap 154. In the example illustrated, each of central portions 150 has an edge cut out 156, allowing a portion of central portion 150 to extend around one of the two corners of opening 36 of primary panel 26 when assembled against primary panel 26. Each of central portions 150 is joined to flaps 152, 154 along the folds 142 which form the joints or hinges about the edges of the formed pockets 140.

As will be shown hereafter, the three triangular flaps, when fully folded into a flat state opposite central portion 150, substantially abut one another edge-to-edge such that the flaps do not overlap one another to create an uneven bulge over the respective pocket 140A, 140B and such that the flaps or 152, 154 are not substantially spaced from one another along their edges so as to form a discernible recess or depression in the plane formed by the three folded triangular flaps 152, 154. In other implementations, each of liner panels 130 may comprise a greater or fewer of such flaps and may comprise flaps that overlap one another. For example, in one implementation, two or more of flaps 152, 154 of each of liner panels 130 may completely overlap one another, avoiding any discernible bulge or depression. In such implementations, because the two or more flaps completely overlap one another, the multiple panels formed by such flaps may increase the overall thickness of pocketed article 120.

Spacer 132 comprises a small panel having the same thickness as the thickness of liner 154. Spacer 132 is positioned between liner panels 130A and 130B spaced apart the subsequently formed pockets 140. In other implementations, spacer 132 may be omitted, such as where a recess is formed between liner panels 130 or in implementations where liner panels 130 are positioned side-by-side in abutment with one another. In other implementations, the spacer 132 can have a thickness other than twice the thickness of the liner 154.

Secondary panel 134 is similar to secondary panel 34 described above except that secondary panel 134 comprises a slit 155 and ears 156A and 156B (collectively referred to as ears 156) which are separated by slit 155. Slit 155 has a width corresponding to the width of spacer 132 and the side-by-side spacing of pockets 140. As it will be described hereafter, ears 156 are sized to overlap central portions 150 of liner panels 130, within the fold lines 142 of each of liner panels 130.

Figure 13:
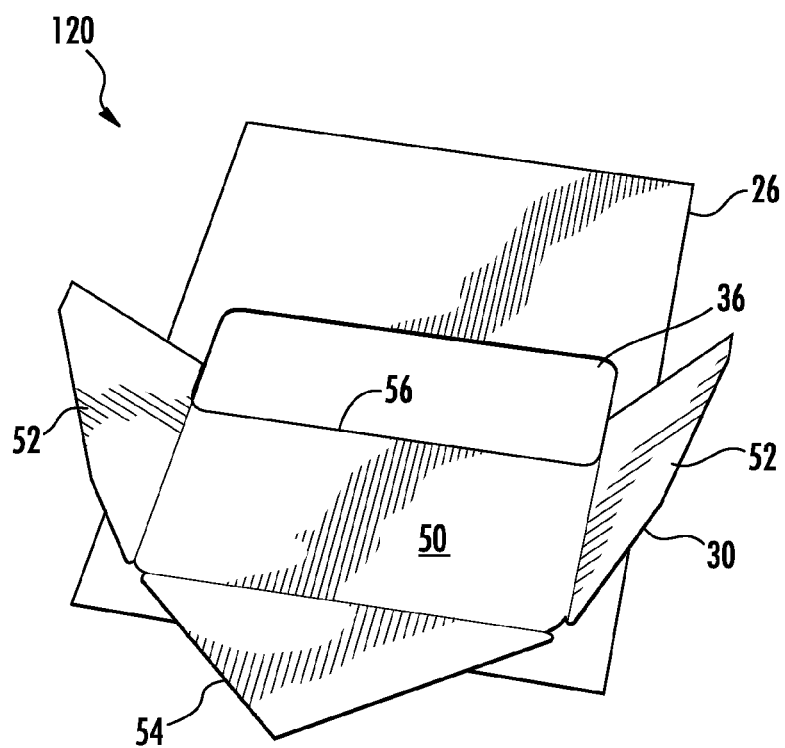
FIG. 13 is a top perspective view illustrating securement of a first liner panel on the first primary panel of FIG. 12.

FIGS. 12-18 illustrate one example method for forming pocketed article 120 using the example components shown in FIG. 11. As shown the FIG. 12, primary panel 26 is placed upon a flat surface. As shown by FIG. 13, liner panel 30 is placed on top of primary panel 26 with edge cut out 56 aligned with one edge of window 36 of primary panel 26 or it can be spaced apart from the edge. In the example illustrated, the bottom or backside of liner panel 30 has an adhesive layer which adheres liner panel 30 to primary panel 26 in the position illustrated. In one implementation, the adhesive layer is covered by peel away film, wherein the peel away film is removed when liner panel 30 is to be assembled to liner panel 26. Preferably, all adhesive layers can be covered by a peel away film, and the removal of the film can be removed in stages or all at once.

In other implementations, portions of primary panel 26 may include an adhesive for adhering liner panel 30 to such portions of primary panel 26 as illustrated in FIG. 13. In yet other implementations, liner panel 30 may be joined to primary panel 26 in the position shown in other fashions. For example, in other implementations, liner panel 30 may be fused or welded to primary panel 26. In still other implementations, liner panel 30 may be joined to primary panel 26 by stitching.

Figure 14:
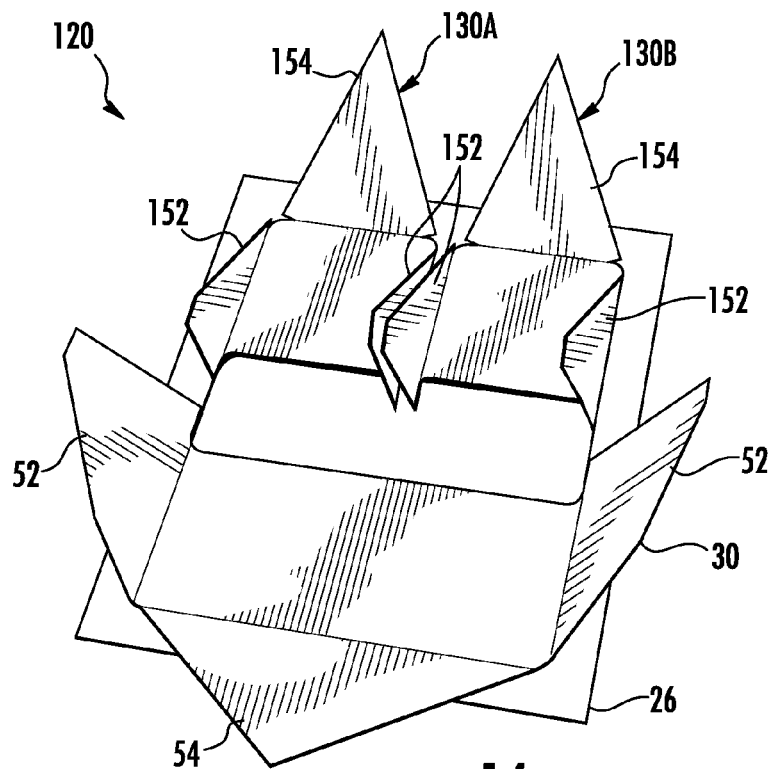
FIG. 14 is a top perspective view illustrating securement of a second liner panel and a third liner panel on the first primary panel of FIG. 12.
Figure 15:
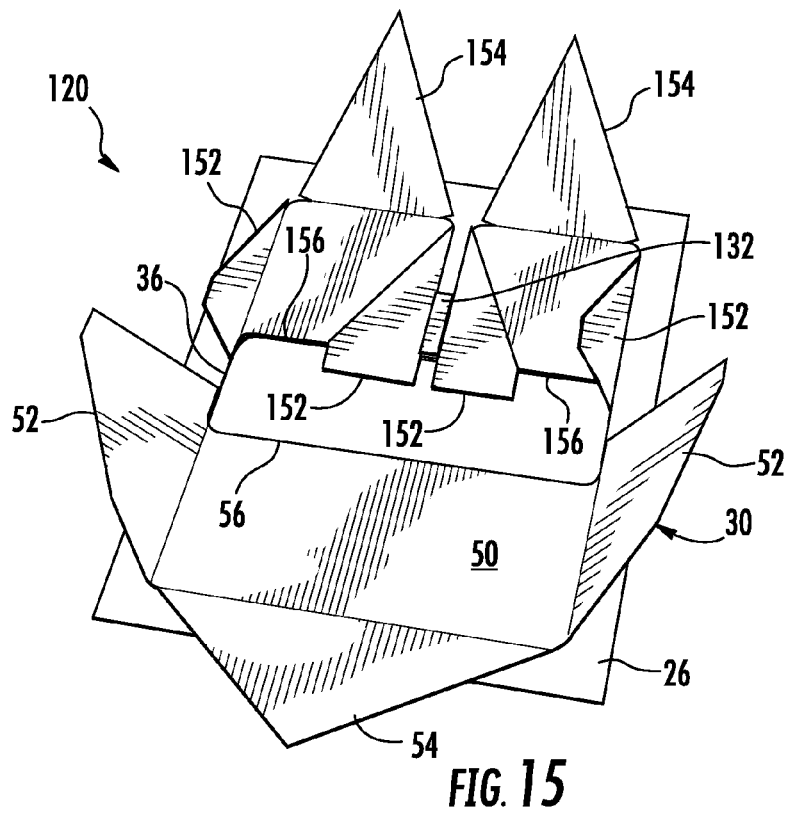
FIG. 15 is a top perspective view illustrating securement of a spacer on the first primary panel of FIG. 12.

As shown by FIGS. 14 and 15, liner panels 130 are placed on top of primary panel 26 with edge cut outs 156 aligned with one edge of window 36 of primary panel 26 opposite to edge cut out 56 of liner panel 30. In one implementation, the bottom or back side of liner panels 130 have an adhesive layer which adheres liner panels 130 to primary panel 26 in the position illustrated. In one implementation, the adhesive layer is covered by peel away film, wherein the peel away film is removed when liner panels 130 are to be assembled to liner panel 26.

In other implementations, portions of primary panel 26 may include an adhesive for adhering liner panels 130 to such portions of primary panel 26 as illustrated in FIG. 13. For example, as illustrated in FIG. 10, primary panel 26 may include adhesive layer 67. In yet other implementations, liner panels 130 may be joined to primary panel 26 in the position shown in other fashions. For example, in other implementations, liner panels 130 may be fused or welded to primary panel 26. In still other implementations, liner panels 130 may be joined to primary panel 26 by stitching.

As shown by FIG. 15 which illustrates the two innermost flaps 152 of liner panels 130 fully folded, spacer 132 is further adhered to primary panel 26 between liner panels 130 with edges of spacer 132 in abutment with the edges of liner panels 130. In yet other implementations, spacer 132 may be omitted.

Figure 16:
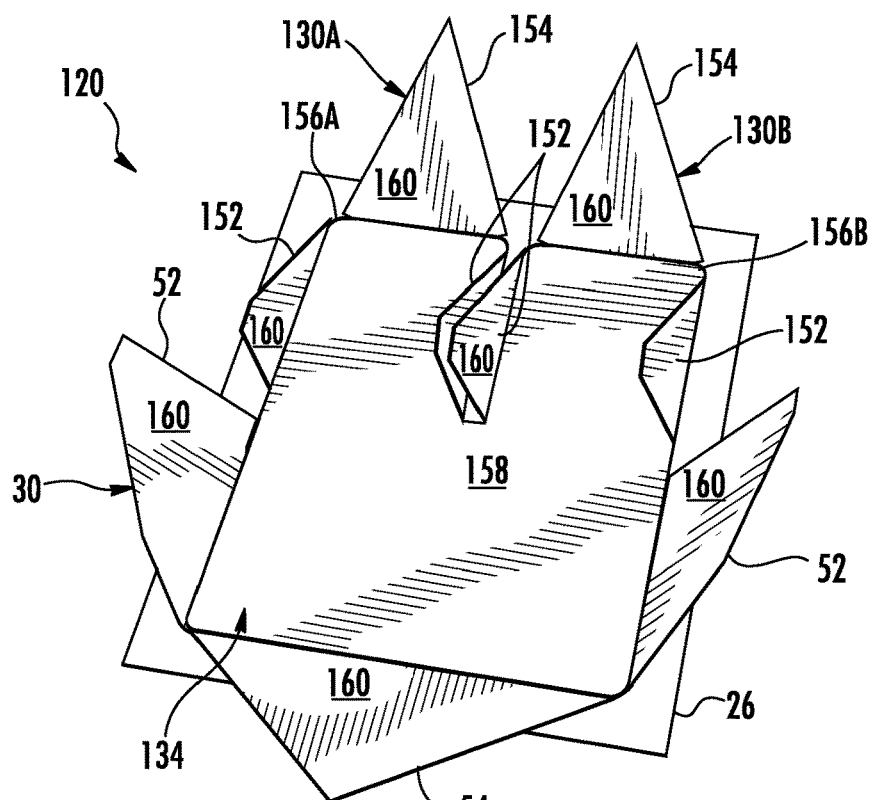
FIG. 16 is a top perspective view illustrating securement of a secondary panel on the first, second and third liner panels.
Figure 17:
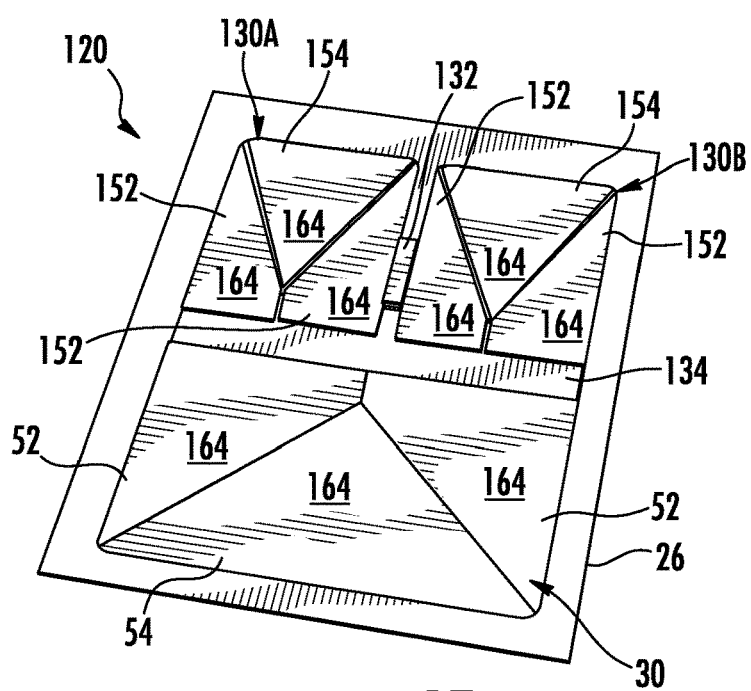
FIG. 17 is a top perspective view illustrating folding a flaps of the first, second and third liner panels about edges of the secondary panel.

As illustrated by FIG. 16, secondary panel 134 is placed on top of central portion 50, across opening 36 and with ears 156A and 156B positioned on top of central portions 150 of liner panels 130A and 130B, respectively. Flaps 52 and 54 of liner panel 30 and flaps 152, 154 of liner panels 130 continue to project from folds 42 and 142, respectively, beyond the perimeter of secondary panel 134. As shown by FIG. 17, flap 52 and 54 are folded about folds 42 so as to extend over and opposite to secondary panel 34. Likewise, flaps 152 and 154 of liner panels 130 are folded about folds 142 so as to extend over and opposite to center portions 150 of ears 156 of secondary panel 34. As further shown by FIG. 17, flaps 52 and 54 as well as flaps 152 and 154 effectively mate with one another in an edge-to-edge abutting fashion so as to not overlap one another and so as to not form any discernible valleys or recesses therebetween. In other implementations, flaps 52, 54 and/or flaps 152, 154, when folded, may alternatively overlap one another or may alternatively have edges that are not insubstantial abutment with one another but which are spaced from one another.

Once in the folded state shown in FIG. 17, flap 52 and 54 and flaps 152 and 154 are secured in place to face 158 of secondary panel 34. In one implementation, face 58 of secondary panel 134 includes an adhesive layer 167 (shown in FIG. 10) that adhesively bonds and retains flaps 52, 54 and flaps 152, 154 in place against face 158 of secondary panel 134. In another implementation, faces 160 of flaps 52, 54 and flaps 152, 154 have an adhesive layer that adhesively bonds and retains flap 52, 54, 152, 154 in place against face 158 of secondary panels 34. In such implementations, the adhesive layers may be temporarily covered by a peel away film and may be peeled away when such adhesive layers are to be exposed and used. In another implementation, the adhesive layers may be non-sticky or non-adhesive until activated, such as being activated through the application of heat. In such implementations, once flaps 52, 54, 152, 154 have been folded, heat may be applied to activate the adhesive to effectuate the adhesive bond.

Once liner panel 30 has been folded to the state shown in FIG. 17, pocket 40 and pockets 140 are formed. Pocket 40 extends between portions of central portion 50 of liner panel 30 and portions of the lower face 62 of secondary panel 34 that face and extend directly opposite to central portion 50. Folds 42 form the perimeter edges of the formed pocket 40. Pockets 140 extend between portions of central portion 150 of liner panels 130 and portions of the lower face 162 of secondary panel 134 that face and extend directly opposite to central portions 150. Folds 142 form the perimeter edges of the formed pockets 140.

Figure 18:
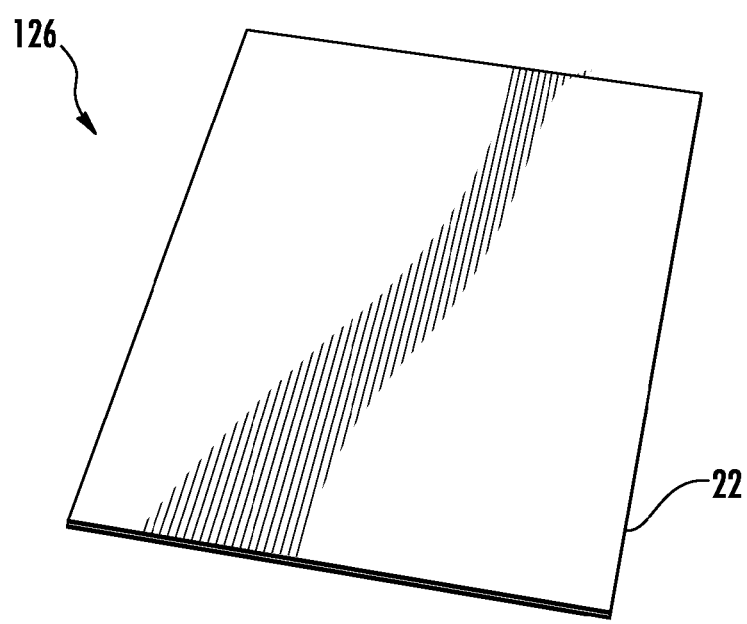
FIG. 18 is a top perspective view illustrating securement of an example second primary panel over the folded flaps of the first, second and third liner panels.

As shown by FIG. 18, the pocketed article 120 is completed by securing primary panel 22 on top of flaps 52, 54 and on top of flaps 152, 154 of liner panels 130. In one implementation, the lower face of primary panel 22 includes an adhesive layer for securing primary panel 22 across and to each of flaps 52, 54, 152, 154. In other implementations, the surfaces 164 of flaps 52, 54 152, 154 may include an adhesive layer adhesively bonding with primary panel 22. As discussed above, the adhesive layer may be covered with a peel away film when the adhesive layer is to be used or may be selectively activatable to an adhesive state.

As shown by FIG. 17, primary panel 26 projects beyond perimeter portions of secondary panel 134 and liner panels 30 and 130, wherein primary panel 22 is secured to primary panel 26, with or without being additionally secured to secondary panel 34 and/or liner panel 30. In one implementation, primary panel 22 is adhesively bonded to those portions of primary panel 26 projecting beyond secondary panel 134 and liner panels 30, 130. In yet other implementations, primary panel 22 is welded or stitched to those portions of primary panel 26 projecting beyond secondary panel 34 and liner panels 30, 130. Because the hinges of pocket 40 about which pocket 40 expands and contracts are not formed by such adhesive or by stitching, but are formed by the folds 42 of liner panel 30, the formed pocket 40 is more durable. Likewise, because the hinges of pockets 140 about which pockets 140 expand and contract are not formed by such adhesive or by stitching, but are formed by the folds 142 of liner panels 130, the formed side-by-side pockets 140 are more durable.

Figure 19:
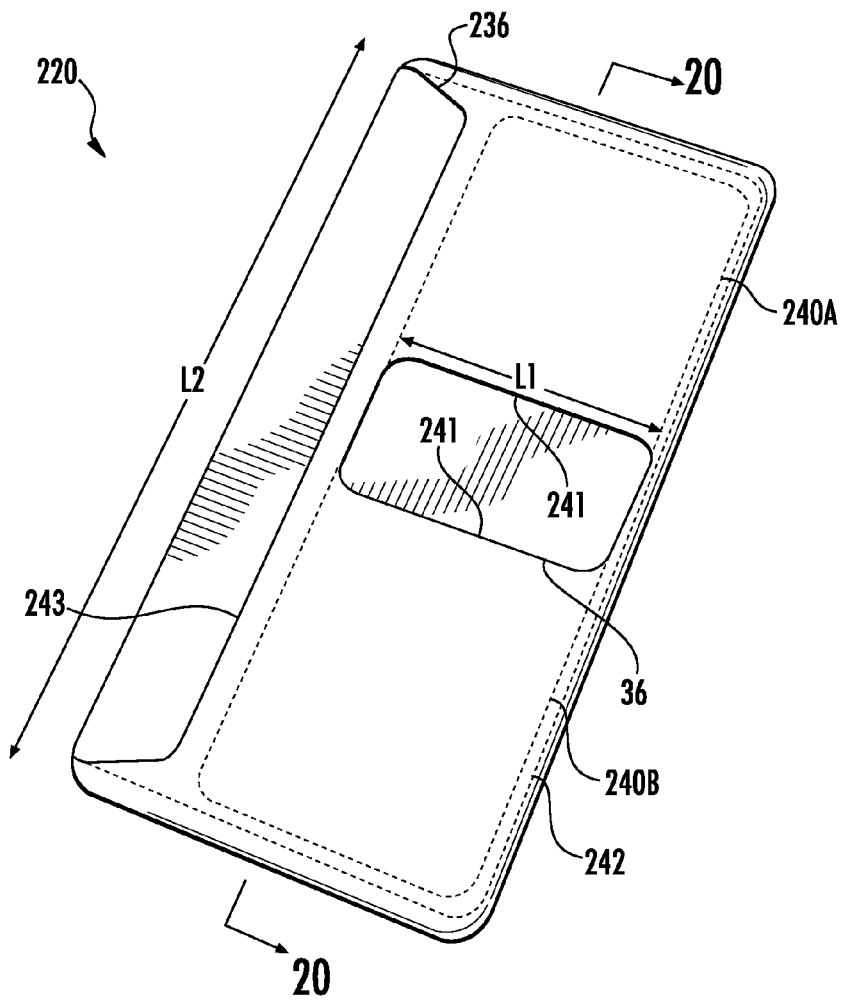
FIG. 19 is a top perspective view of another example pocketed article.
Figure 20:
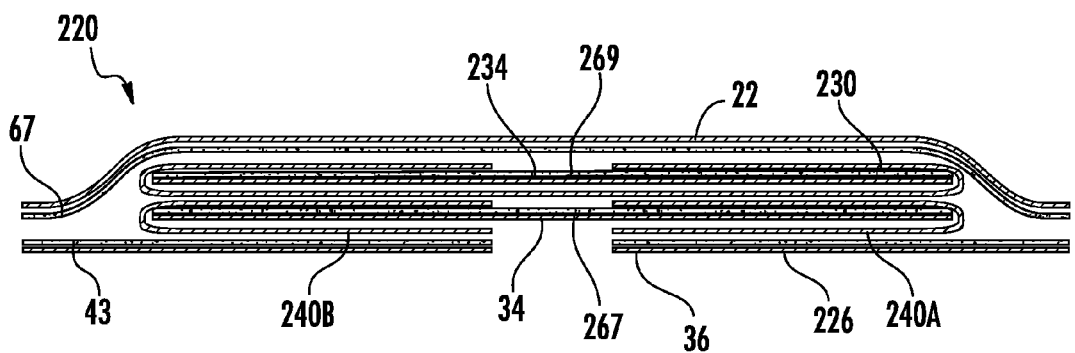
FIG. 20 is a sectional view of the pocketed article of FIG. 19 taken along line 20-20.

FIGS. 19 and 20 illustrate an example pocketed article 220. Similar to pocketed article 120, pocketed article 220 comprises multiple pockets with each of the multiple pockets having perimeter hinges formed by folds of a liner panel that wraps about edges of a secondary panel. Unlike pocketed article 120, two pockets of pocketed article 220 have mouths that face in directions perpendicular to one another. The two pockets of pocketed article 220 have mouths that face one another. Pocketed article 220 comprises pockets that are formed on top of one another or overlap one another in the absence of any folding of the overall pocketed article 120.

As shown by FIGS. 19 and 20, pocketed article 220 comprises pocket 240A having a mouth 241A facing in a first direction, pocket 240B having a mouth 241B facing in a second direction opposite to the first direction so as to face pocket 240A (pockets 240A and 240B being collectively referred to as pockets 240) and a third pocket 242 having a mouth 243 facing in a third direction perpendicular to the first direction and the second direction. Pockets 240A and 240B overlap or extend on top of pocket 242. Mouths 241 of pockets 240 each have a first length L1 while mouth 243 of pocket 242 has a second length L2 that is greater than length L1. In the example illustrated, length L2 is over twice as long as length L1. In another implementation, the mouths can be facing upward.

In one implementation, length L1 is sized longer than the major dimension of credit or debit card, driver's license and/or gift cards, but not greater than 1 inch longer than such major dimensions. In one implementation, length L1 has a length of at least 3⅜ of an inch (8.57 cm) and not greater than 4⅜ of an inch (11.11 cm). In one implementation, length L1 has a length of at least 3.5 inches (7.62 cm) and no greater than 3¾ of an inch (9.53 cm).

In one implementation, length L2 is sized longer than the major dimension of United States paper currency (6⅛ of an inch or 15.56 cm) or other international denominations such as the Euro. In one implementation, the length L2 is at least 9 inches. At the same time, pocket 242 has a depth of at least the miter dimension of United States paper currency (2⅝ of an inch or 6.67 cm). In the example illustrated, pocket 242 has a depth corresponding to length L1. Pocket 230 has a depth of at least the minor dimension of credit or debit card, driver's license and/or gift cards (2⅛ of an inch or 5.40 cm). In still other implementations, pockets 240 and 242 may have other dimensions.

Figure 21:
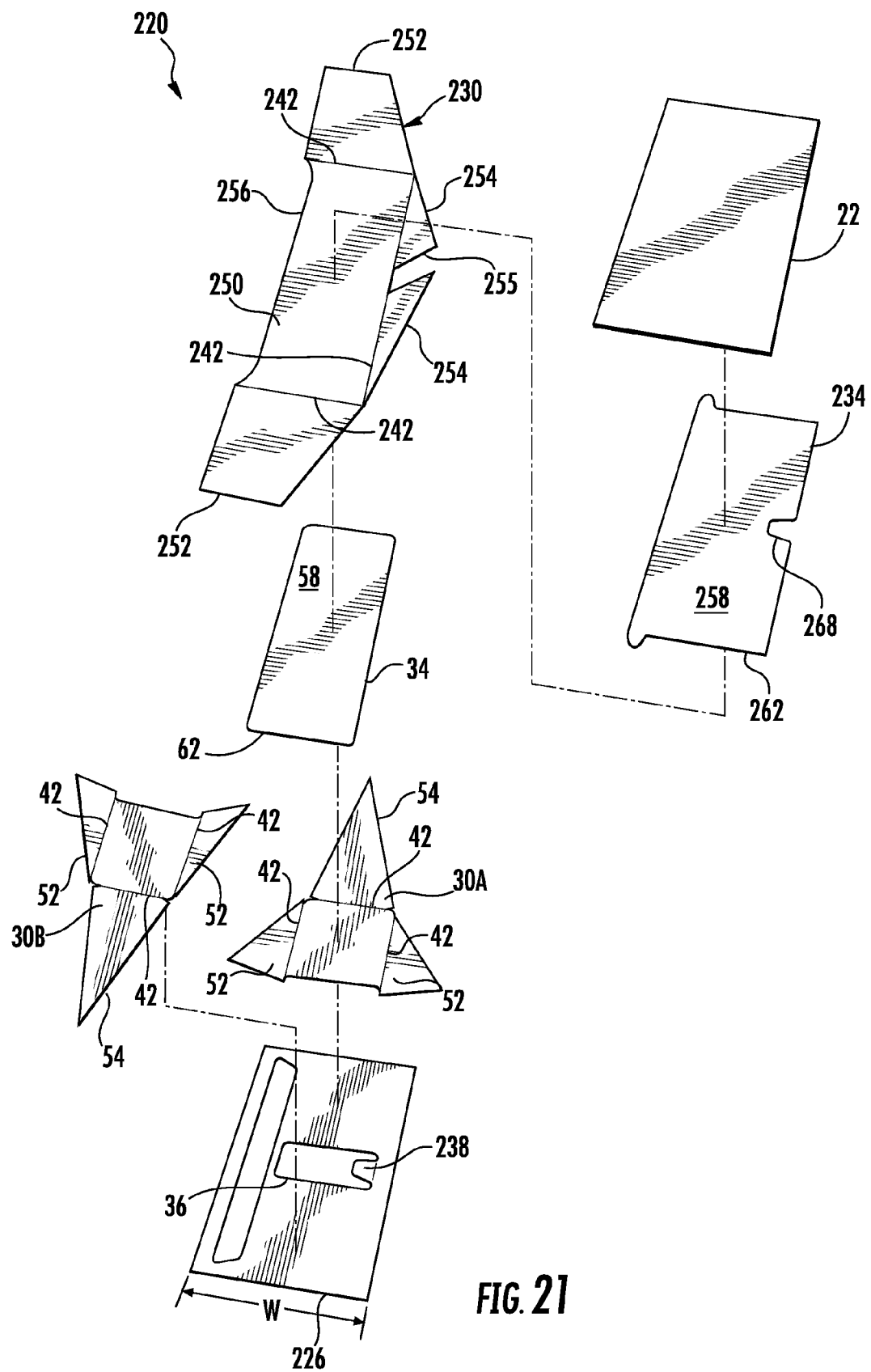
FIG. 21 is an exploded perspective view of the pocketed article of FIG. 19.

FIG. 21 is an exploded perspective view of example components or panels that may be utilized to form pocketed article 220. Pocketed article 220 comprises primary panel 22, primary panel 226, liner panel 30A, liner panel 30B, secondary panel 34, liner panel 230 and secondary panel 234. Primary panel 226 is similar to primary panel 26 except that primary panel 226 additionally comprises window or opening 236 and flap 238. Those remaining components of primary panel 226 which correspond to components of primary panel 26 are numbered similarly.

Flap 238 projects into opening 36. As will be described hereafter, flap 238 is subsequently secured to panel 22, directly connecting primary panel 226 to liner panel 230. In some implementations, flap 238 may be omitted.

Liner panel 230 is similar to liner panels 30 except that liner panel 230 has a major dimension that extends along window 236, along the length of primary panels 22 and 226. Due to the length of liner panel 230, liner panel 230 is differently shaped. As shown by FIG. 21, like liner panels 30, liner panel 230 comprises a central portion 250 side petals or flaps 252, and flaps 254 separated by a slot 255 and edge cut out 256. In other implementations, the liner panel 230 can be formed without slot 255.

In the example shown in FIG. 21, central portion 250 is generally rectangular, having a length corresponding to the length of window 236. Edge cut out 256 extends along central portion 250 and is shaped so as to correspond to the edge of window 236, allowing a portion of central portion 250 to extend around one of the two corners of opening 236 of primary panel 226 when assembled against primary panel 226. Central portion 250 is joined to flaps 252, 254 along the folds 242 which form the joints or hinges about the edges of the formed pocket 242.

As will be shown hereafter, the flaps 252 and 254, when fully folded into a flat state opposite central portion 250, substantially abut one another edge-to-edge such that the flaps do not overlap one another to create an uneven bulge over pocket 242 and such that the flaps 252 and 254 are not substantially spaced from one another along their edges so as to form a discernible recess or depression In one example, it may be spaced apart by no greater than 0.125 inches or no greater than 0.32 cm) in the plane formed by the folded flaps 252, 254 over pocket 242. In other implementations, liner panel 30 may comprise a greater or fewer of such flaps and may comprise flaps that overlap one another. For example, in one implementation, two or more of flaps 252, 254 may completely overlap one another, avoiding any discernible bulge or depression. In such implementations, because the two or more flaps completely overlap one another, the multiple panels formed by such flaps may increase the overall thickness of pocketed article 220. In yet other implementations, flaps 252, 254 may be spaced apart from one another, each flap extending slightly beyond their respective fold 242 by sufficient distance for being secured to secondary panel 234.

Secondary panel 234 similar to secondary panel 34 except that secondary panel 234 is substantially coextensive with central portion 250 of liner panel 230 ("substantially" meaning that the dimensions of the secondary panel 234 may be slightly smaller just enough to permit flaps 252, 254 of the underlying liner panel 230 to be folded are wrapped about the edges of secondary panel 234). In the example illustrated, secondary panel 234 additionally comprises slot 268. Slot 268 is sized to receive flap 238 of primary panel 236, facilitating direct adhesive securement of flap 238 to central portion 250 to panel 22. In other implementations, slot 268 may be omitted where flap 238 is omitted. In yet other implementations, flap 238 may be adhesive secured directly to secondary panel 234.

Figure 22:
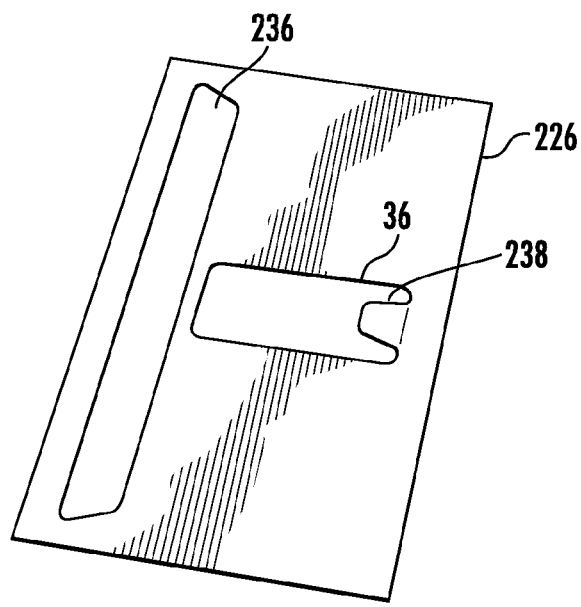
FIG. 22 is a top perspective view of an example first primary panel of the pocketed article of FIG. 19.
Figure 23:
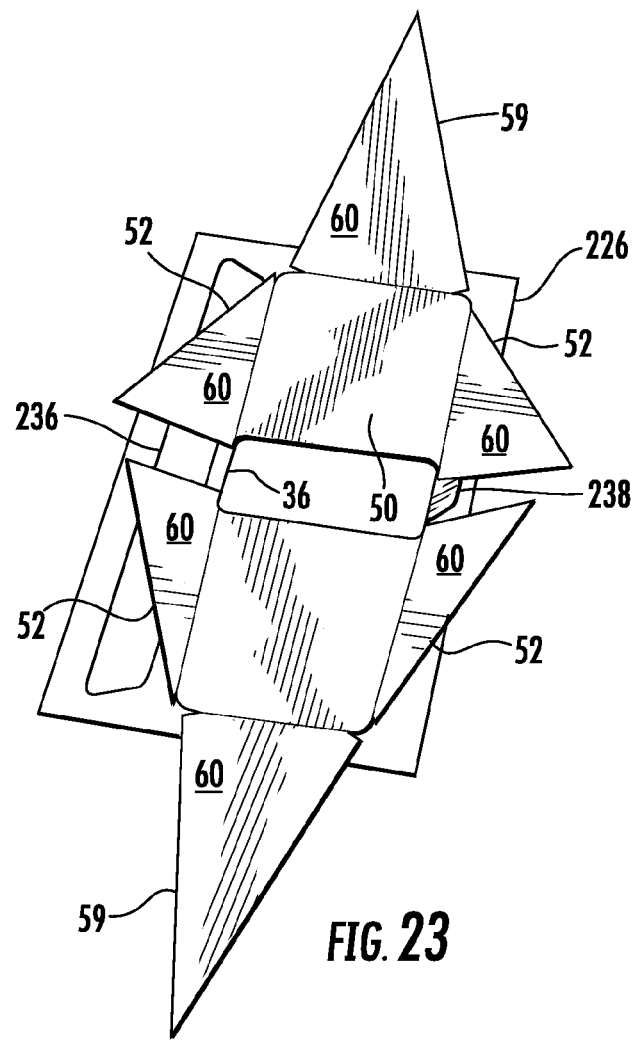
FIG. 23 is a top perspective view illustrating securement of a first liner panel and a second liner panel on the first primary panel of the pocketed article of FIG. 19.

FIGS. 22-29 illustrate one example method for forming or assembling pocketed article 220 from the example components shown in FIG. 21. As shown in FIG. 22, primary panel 226 is placed upon a flat surface. As shown by FIG. 23, liner panel 30A and 30B are placed on top of primary panel 226 with edge cut outs 56 aligned with opposite edges of window 36 of primary panel 226. In the example illustrated, the bottom or backside of each of liner panels 30 has an adhesive layer which adheres secondary panel to primary panel 226 in the positions illustrated. In one implementation, the adhesive layer is covered by peel away film, wherein the peel away film is removed when liner panels 30 are to be assembled to primary panel 226. In other implementations, the adhesive layer may be non-adhesive until activated, such as by the application of heat once in position against primary panel 226.

In other implementations, portions of primary panel 226 may include an adhesive for adhering liner panels 30 to such portions of primary panel 226 as illustrated in FIG. 23. In yet other implementations, liner panels 30 may be joined to primary panel 226 in the positions shown in other fashions. For example, in other implementations, liner panels 30 may be fused or welded to primary panel 226. In still other implementations, liner panels 30 may be joined to primary panel 226 by stitching. In one implementation, two-sided adhesive tape may be applied to surfaces 64.

Figure 24:
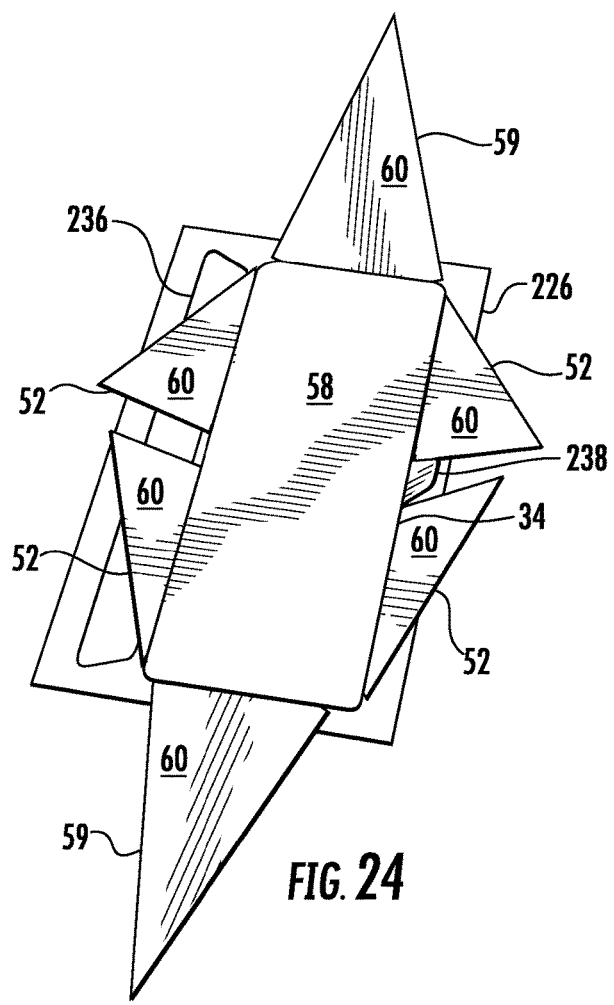
FIG. 24 is a top perspective view illustrating securement of a first secondary panel on the first liner panel and on the second liner panel of the pocketed article of FIG. 19.
Figure 25:
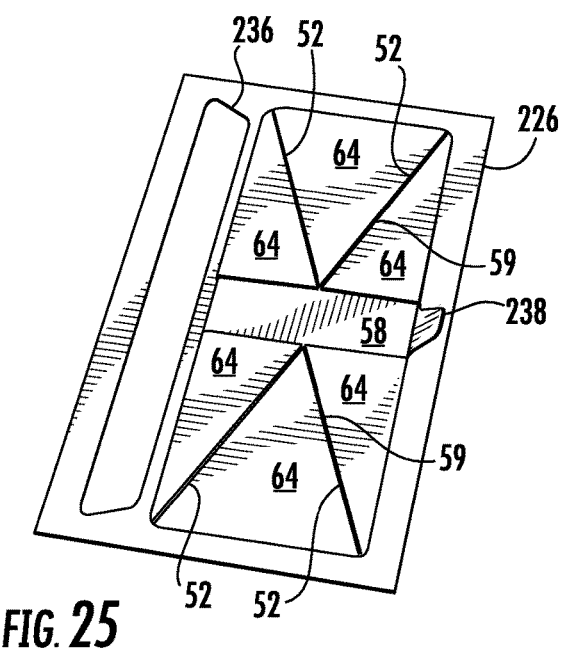
FIG. 25 is a top perspective view illustrating folding flaps of the first liner panel and of the second liner panel about edges of the first secondary panel of the pocketed article of FIG. 19.

As illustrated by FIG. 24, secondary panel 34 is placed on top of central portion 50 of each of liner panels 30 and across opening 36. Flaps 52 and 54 of liner panels 30 and flap 238 of primary panel 226 continue to project from the respective folds beyond the perimeter of secondary panel 34. As shown by FIG. 25, flaps 52 and 54 of each of liner panels 30 are folded about folds 42 so as to extend over and opposite to secondary panel 34. As further shown by FIG. 25, flaps 52 and 54 of each of liner panels 30 effectively mate with one another in an edge-to-edge abutting fashion so as to not overlap one another and so as to not form any discernible valleys or recesses therebetween. In other implementations, flaps 52, 54 when folded, may alternatively overlap one another or may alternatively have edges that are not in substantial abutment with one another but which are spaced from one another.

Once in the folded state shown in FIG. 25, flaps 52 and 54 are secured in place to face 58 of secondary panel 34. In one implementation, face 58 of secondary panel 134 includes an adhesive layer 267 (shown in FIG. 20) that adhesively bonds and retains flaps 52, 54 in place against face 58 of secondary panel 34. In another implementation, faces 60 of flaps 52, 54 have an adhesive layer that adhesively bonds and retains flaps 52, 54 in place against faces 58 of secondary panel 34. In such implementations, the adhesive layers may be temporarily covered by a peel away film may be peeled away when such adhesive layers are to be exposed and used. In another implementation, the adhesive layers may be non-sticky or non-adhesive until activated, such as being activated through the application of heat. In such implementations, once flaps 52, 54 been folded, heat may be applied to activate the adhesive to effectuate the adhesive bond.

Once liner panels 30 have been folded to the state shown in FIG. 25, pockets 240 are formed. Pockets 240 extend between portions of central portions 50 of liner panels 30 and portions of the lower face 62 (opposite to face 58) of secondary panel 34 that face and extend directly opposite to one another. Folds 42 form the perimeter edges of the formed pocket 240.

As shown by FIG. 26, liner panel 230 is placed on top of the folded flaps 52, 54 of liner panels 130 and across window 36 with edge cut out 256 aligned with one edge of window 236 of primary panel 226. In one implementation, the bottom or backside of liner panel 230 has an adhesive layer 279 (shown in FIG. 20) which adheres liner panel 230 to the folded ears 52, 54 of liner panels 130 in the position illustrated. In one implementation, the adhesive layer is covered by peel away film, wherein the peel away film is removed when liner panel 230 is to be assembled to the folded ears 52, 54 of liner panels 130 in the position illustrated. In yet other implementations, the adhesive layer is heat activatable.

In other implementations, faces of flaps 52, 54 of liner panels 30 may include an adhesive for adhering such flap 52, 54 of liner panels 30 to liner panel 230. In yet other implementations, liner panel 230 may be joined to the folded flap 52, 54 in the position shown in other fashions. For example, in other implementations, liner panel 230 may be fused or welded to the folded flaps 52, 54 of liner panels 30. In still other implementations, liner panel 230 may be joined to the folded flaps 52, 54 of liner panels 30 by stitching.

Figure 28:
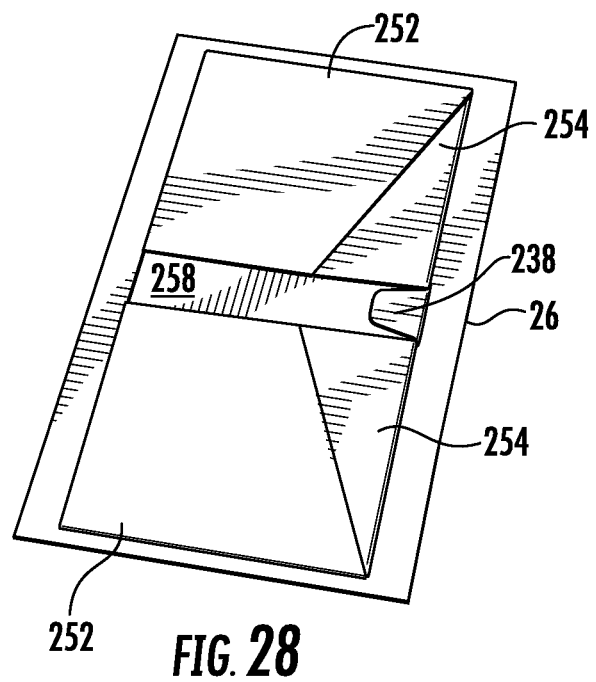
FIG. 28 is a top perspective view illustrating folding of flaps of the second liner panel about edges of the second secondary panel.

As illustrated by FIG. 27, secondary panel 234 is placed on top of central portion 250 of liner panel 230. Flaps 252 and 254 of liner panel 230 continue to project from folds 242 beyond the perimeter of secondary panel 234. As shown by FIG. 28, flaps 252 and 254 are folded about folds 242 so as to extend over and opposite to secondary panel 234. As further shown by 28, flaps 252 and 254 effectively mate with one another in an edge-to-edge abutting fashion so as to not overlap one another and so as to not form any discernible valleys or recesses therebetween. Flaps 252 and 254 on opposite sides of slot 268 are spaced from one another. In other implementations, flaps 252 may abut one another when folded.

As further shown by FIG. 28, flap 238 is folded about the edge of secondary panel 34 and about the edge of liner panel 230, wherein flap 238 is folded into slot 268 of secondary panel 234 and secured directly to panel 22. In one implementation, flap 238 is adhesively bonded to panel 22. In other implementations, flap 238, once folded, may be welded, fused or stitched to panel 22. Flap 238 facilitates direct connection of primary panel 226 to panel 22 and pocket 242. In other implementations, flap 238 may be directly secured to secondary panel 234, such as where slot 268 is omitted. In yet other implementations, flap 238 may be omitted.

Once in the folded state shown in FIG. 28, flaps 252 and 254 are secured in place to face 258 of secondary panel 234. In one implementation, face 258 of secondary panel 234 includes an adhesive layer 269 (shown in FIG. 20) that adhesively bonds and retains flaps 252 and 254 in place against face 258 of secondary panel 234. In another implementation, faces 260 of flaps 252 and 254 have an adhesive layer that adhesively bonds and retains flaps 252 and 254 in place against face 258 of secondary panel 234. In such implementations, the adhesive layers may be temporarily covered by a peel away film may be peeled away when such adhesive layers are to be exposed and used. In another implementation, the adhesive layers may be non-sticky or non-adhesive until activated, such as being activated through the application of heat. In such implementations, once flaps 252 and 254 been folded, heat may be applied to activate the adhesive to effectuate the adhesive bond.

Once liner panel 230 has been folded to the state shown in FIG. 28, pocket 242 is formed. Pocket 242 extends between portions of central portion 250 of liner panel 230 and portions of the lower face 262 of secondary panel 234 that face and extend directly opposite to central portion 250. Folds 242 form the perimeter edges of the formed pocket 242.

Figure 29:
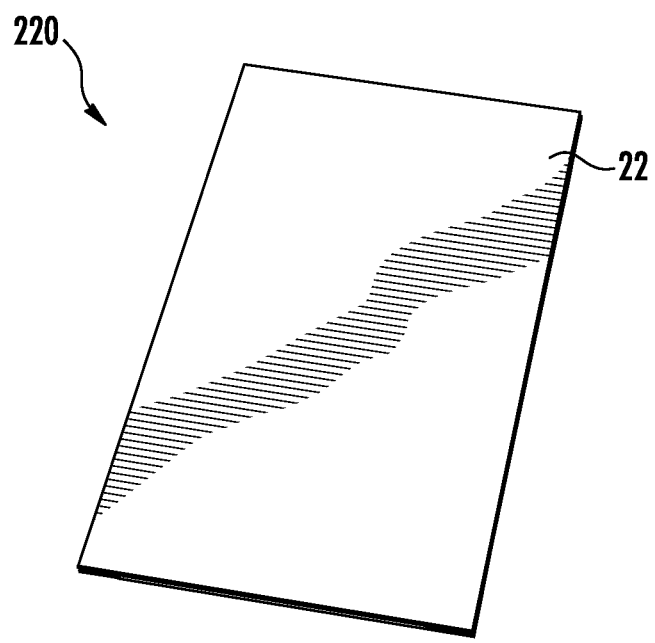
FIG. 29 is a top perspective view illustrating securement of a second primary panel over the folded flaps of the second liner panel.

As shown by FIG. 29, the pocketed article 220 is completed by securing primary panel 22 on top of flaps 252 and 254 and on top of the uncovered portions of face 258 of secondary panel 234. In one implementation, the lower face of primary panel 22 includes an adhesive layer for securing primary panel 22 across and to each of flaps 252, 254 and uncovered portions of face 258 of secondary panel 234. In other implementations, the uncovered portions of face 258 of secondary panel 234 and surfaces 64 of flaps 52 and 54 may include an adhesive layer adhesively bonding with primary panel 22. As discussed above, the adhesive layer may be covered with a peel away film when the adhesive layer is to be used or may be selectively activatable to an adhesive state.

In the example illustrated, primary panel 26 projects beyond perimeter portions of secondary panel 234 and liner layer 230, wherein primary panel 22 is secured to primary panel 226, in addition to being secured to secondary panel 234 and/or liner panel 230. In one implementation, primary panel 22 is adhesively bonded to those portions of primary panel 226 projecting beyond secondary panel 234 and liner panel 230. In yet other implementations, primary panel 22 is welded or stitched to those portions of primary panel 226 projecting beyond secondary panel 234 and liner panel 230. Because the hinges of pocket 242 about which pocket 242 expands and contracts are not formed by such adhesive bother stitching, but are formed by the folds 242 of liner panel 230, the formed pocket 242 is more durable.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A pocketed article comprising:
a first primary panel;
a liner panel having a first face bonded to the first primary panel and a second face opposite the first face of the liner panel;
a secondary panel having a first face facing the second face of the liner panel and a second face opposite the first face of the secondary panel, wherein outer portions of the liner panel are folded about edges of the secondary panel and wherein the outer portions are bonded to the second face of the secondary panel; and
a second primary panel joined to the first primary panel.

2. The pocketed article of claim 1 further comprising a second liner panel having a first face bonded to the first primary panel and a second face opposite the first face of the second liner panel, wherein outer portions of the second liner panel are folded about edges of the secondary panel, wherein the outer portions of the second liner panel are bonded to the second face of the secondary panel.

3. The pocketed article of claim 1 further comprising:
a second liner panel having a first face bonded to the outer portions of the liner panel and a second face opposite the first face of the second liner panel; and
a second secondary panel having a first face facing the second face of the second liner panel and a second face opposite the first face of the second secondary panel, wherein outer portions of the second liner panel are folded about edges of the second secondary panel and wherein the outer portions of the second liner panel are bonded to the second face of the second secondary panel.

4. The pocketed article of claim 1 further comprising:
a second liner panel having a first face bonded to the first primary panel and a second face opposite the first face of the second liner panel;
a third liner panel having a first face bonded to the first primary panel and a second face opposite the first face of the third liner panel, wherein the secondary panel comprises:
a main portion about which the liner panel is folded;
a first ear extending from the main portion and about which outer portions of the second liner panel are folded; and
a second ear extending from the main portion and about which outer portions of the third liner panel are folded, the second ear being separated from the first ear by an opening, wherein the outer portions of the second liner portion and the outer portions of the third liner portion and are bonded to the second face of secondary panel and wherein the second primary panel is bonded to the outer portions of the liner panel, the outer portions of the second liner panel, the outer portions of the third liner panel and the first primary panel.

5. The pocketed article of claim 1, wherein each of the outer portions is directly bonded to the secondary panel.

6. The pocketed article of claim 1, wherein each of the outer portions are triangular.

7. The pocketed article of claim 1, wherein the liner panel comprises a fabric liner panel.

8. The pocketed article of claim 1, wherein the first primary panel and the second primary panel are a leather or synthetic leather.

9. The pocketed article of claim 8, wherein the secondary panel is a leather or synthetic leather.

10. The pocketed article of claim 1, wherein the first primary panel, the second primary panel and the secondary panel are each formed from a same material.

11. The pocketed article of claim 1, wherein the first primary panel and the second primary panel form outer most panels of the pocketed article.

12. The pocketed article of claim 1, wherein the secondary panel has a first rigidity and wherein the liner panel has a second rigidity less than the first rigidity.

13. The pocketed article of claim 1, wherein the liner panel comprises a fabric liner panel and wherein the first primary panel and the second primary panel comprise leather.

14. A pocketed article comprising:
a first leather panel;
a fabric liner panel having a first face bonded to the leather panel and a second face opposite the first face of the fabric liner panel;
a second leather panel having a first face facing the second face of the liner panel and a second face opposite the first face of the second leather panel, wherein outer portions of the fabric liner panel are folded about edges of the second leather panel and wherein the outer portions are bonded to the second face of the second leather panel, wherein each of the outer portions is directly bonded to the second leather panel; and
a third leather panel joined to the first leather panel.

15. The pocketed article of claim 1, wherein the outer portions of the liner panel are directly bonded to the second face of the secondary panel with an adhesive layer having a having a first surface contacting the liner panel and a second surface contacting the second face of the second panel.

16. The pocketed article of claim 1, wherein the outer portions of the liner panel, when folded about the edges of the secondary panel abut one another edge-to-edge.

17. The pocketed article of claim 1, wherein the first primary panel comprises a completely surrounded opening extending through the first primary panel.

18. The pocketed article of claim 17, wherein the liner panel comprises an edge extending parallel to and along an edge of the completely surrounded opening.

19. The pocketed article of claim 17, wherein the first primary panel comprises a second completely surrounded opening extending through the first primary panel.

20. The pocketed article of claim 1, wherein the first primary panel, the liner panel, the secondary panel and the second primary panel form a stack comprising, in order, portions of the first primary panel, portions of the liner panel, portions of the secondary panel, portions of the liner panel and portions of the second primary panel.

* * * * *